2,901,503

DIALKYLAMINOPHENYL ESTERS OF THIOPHOSPHORIC ACIDS

Howard M. Fitch, New York, N.Y., assignor to Campbell Pharmaceuticals, Inc., New York, N.Y., a corporation of Delaware No Drawing. Application August 28, 1956
Serial No. 606,563

20 Claims. (Cl. 260—461)

This invention relates to a new group of compounds which are effective vasodilators and to methods for the production of such compounds. The application is a continuation-in-part of my application Serial No. 442,205, filed July 8, 1954, which is a continuation-in-part of my application Serial No. 297,169, filed July 3, 1952.

The compounds of the invention comprise dialkylaminophenyl thiophosphate esters wherein at least two thiophosphate groups are linked together by means of a divalent polyatomic group.

The compounds of the invention have the general formula

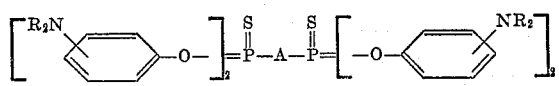

wherein R represents a lower alkyl group and A represents a divalent polyatomic group, such as a hydrazino group, a diiminoalkylene group, a polyiminopolyalkylene group, a diiminoarylene group, a diiminoaralkylene group, a group in which at least two imino nitrogens are part of a heterocyclic ring, an alkylene dioxy group or an arylene dioxy group. The compounds may be prepared or used in the form of their salts with inorganic and organic acids or their quaternary salts, for example, with alkyl halides and sulfates.

The compounds of the invention in the form of the quaternary salts are long acting vasodilators which are many times as active as analogous esters containing only one thiophosphate group in the molecule. This vasodilator action causes an increase in the circulation of the blood to various tissues of the body and a decrease in blood pressure.

The compounds of the invention may be prepared by combining two molecules of a dialkylaminophenol with one molecule of thiophosphoryl halide, and treating the resulting di-(dialkylaminophenyl)thiophosphoryl halide with an equivalent amount of a compound containing two or more primary or secondary amino groups or hydroxy groups in the molecule. Hydrogen halide is evolved and may react with the dialkylamino groups of the starting material or product. Better yields and an increased utilization of the reagents are obtained by using an acid acceptor to react with the hydrogen halide. Tertiary amines are suitable acid acceptors. Alkyl tertiary amines such as triethylamine and tripropylamine, and heterocyclic tertiary amines, such as pyridine, are preferred. Aqueous or alcoholic solutions of an alkali metal hydroxide may also be used as acid acceptors in some cases. The reaction may be accomplished in steps, if desired, with isolation of intermediates containing only one thiophosphate linkage in the molecule.

The compounds of the invention may also be prepared by combining each amino or hydroxy group of a compound containing two or more amino or hydroxy groups in the molecule with a molecule of thiophosphoryl trihalide to give a substituted thiophosphoryl dihalide, which is caused to react with two molecules of an alkali metal di-alkylaminophenate. Other methods of preparation useful in special cases will be apparent from the examples.

In general, the compounds of the invention are colorless to amber viscous oils or resins. They are very soluble in benzene or acetone, somewhat soluble in ether or alcohol and very insoluble in water or petroleum ether. A few of the compounds are crystalline, although they do not melt sharply.

The bases show the typical behavior of weakly basic tertiary amines, forming salts with mineral acids, such as hydrochloric, hydrobromic or sulfuric acid, and quaternary salts with alkyl halides or sulfates such as methyl iodide, methyl bromide or dimethyl sulfate. The salts with mineral acids tend to dissociate in water and are completely water-soluble only in the presence of an excess of the mineral acid. The quaternary ammonium salts are water-soluble. They tend to be solvated and are usually obtained as amorphous or micro-crystalline solids or very viscous oils or resins. The solid quaternary salts do not melt sharply, and the apparent melting points depend on the rate of heating. For all melting points reported, the rate of heating was 5° C. per minute or slower.

In the following specific examples, illustrative of the compounds and methods of the invention, the symbol "Z" is used to represent the di-(m-dimethylaminophenyl) thiophosphoryl group,

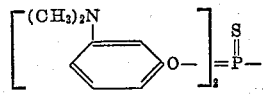

and "X" is used to represent the di-p-dimethlaminophenyl-thiophosphoryl group,

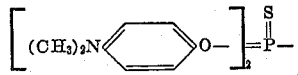

PREPARATION OF INTERMEDIATES

*Example 1.* — *Di - (m - dimethylaminophenyl)thiophosphoryl chloride*

$$Z.Cl$$

A solution of 13.71 g. m-dimethylaminophenol (0.10 mole) and 10.11 g. triethylamine (0.10 mole) in 100–200 cc. benzene is added to 8.47 g. phosphorus thiochloride (0.05 mole) in 50–100 cc. benzene with stirring at 3–5° C. during 4–6 hours. The mixture is left at room temperature for 3 days or longer or is heated at about 75° C. for 2–3 hours and cooled and is filtered from triethylamine hydrochloride. In some cases the filtrate is used directly and in other cases solvent is removed by distillation under reduced pressure, leaving di-(m-dimethylaminophenyl)-thiophosphoryl chloride as a residual oil.

*Example 2.* — *Di-(m-dimethylaminophenyl) ester of hydrazinothiophosphonic acid*

$$Z.NHNH_2$$

Hydrazine and di-(m-dimethylaminophenyl)thiophosphoryl chloride are heated in benzene at 70–75° C. for 7 hours. The base crystallizes from 95% alcohol as white crystals, m.p. 117–8° C.

*Example 3.*—*Di-(m-dimethylaminophenyl)aminothiophosphonate*

$$Z.NH_2$$

To a suspension of 1.48 g. di-(m-dimethylaminophenyl) thiophosphoryl chloride (0.004 mole) in 10 cc. acetone is added 1.0 cc. concentrated ammonium hydroxide (0.015 mole). After an hour of occasional stirring at room temperature, the thiophosphoryl chloride dissolves. The solution is left at room temperature overnight, then diluted with 100 cc. water and filtered. The precipitate is crude di-(m-dimethylaminophenyl) ester of aminothiophosphonic acid.

*Example 4. — N - di-(m-dimethylaminophenyl)thiophosphoryl-N-p-di-methylaminobenzyl - 3 - dimethylaminopropylamine*

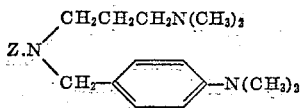

N-3 - dimethylaminopropyl - p - dimethylaminobenzylamine is prepared by condensing 3-dimethylaminopropylamine with p-dimethylaminobenzaldehyde in 95% alcohol and hydrogenating the resulting Schiff's base at room temperature and 1–3 atmospheres hydrogen pressure using a platinum oxide catalyst. It is a colorless liquid B.P. 138–40° C./0.5 mm., $n_D^{25}$ 1.5347. It is heated with di - (m - dimethylaminophenyl)thiophosphoryl chloride, without a solvent for 3 hours at 130° C. and for 1 hour at 160° C. The resulting base is a yellow oil that distills at about 180° C. at 1–2 microns pressure, $n_D^{25}$ 1.5940.

*Example 5.—Di-(p-dimethylaminophenyl)thiophosphoryl chloride*

X.Cl

A solution of 8.73 grams p-dimethylaminophenol (0.064 mole) and 6.58 g. triethylamine (0.065 mole) in 100 cc. benzene is added with stirring during 1 hour to a solution of 5.34 g. phosphorus thiochloride (0.032 mole) in 150 cc. benzene at 22–30° C. The reaction mixture is heated to 70° C. during 1 hour, stirred at 70–75° C. for 3 hours and filtered hot from 7.36 g. triethylamine hydrochloride. The filtrate is concentrated to about 25 cc. on a steam bath, diluted with 50 cc. isopropanol and filtered, yielding 8.25 g. (71% theory) of crude di-(p-dimethylaminophenyl)thiophosphoryl chloride. When purified by crystallization from a mixture of benzene and isopropanol and from isopropanol, long white needles melting at 165.5–6.5° C. are obtained.

*Example 6.—Di-(m-dimethylaminophenyl) ester of ethylenediaminothiophosphonic acid*

Z.NH(CH$_2$)$_2$NH$_2$

A solution of 92.7 g. di-(m-dimethylaminophenyl)-thiophosphoryl chloride (0.25 mole) in 550 cc. benzene is added to a solution of 90.2 g. ethylene diamine (1.50 mole) in 100 cc. benzene with stirring at 3–5° C. during 4 hours. The mixture is slowly warmed to room temperature with stirring during 3 hours and is left at room temperature overnight and filtered. The precipitate is washed with 150 cc. benzene, air-dried, stirred well with a solution of 15 cc. saturated sodium carbonate in 300 cc. water and filtered. The precipitate, washed well with water and air-dried, is 44.8 g. crude di-(m-dimethylaminophenyl) ester of ethylenediaminothiophosphonic acid. The benzene filtrate and wash are combined and washed with two 500 cc. and two 200 cc. portions of water. After the first wash, the benzene solution must be heated to prevent precipitation. The benzene solution is then iced and filtered. The precipitate, washed with 100 cc. cold benzene and air-dried, is 30.1 g. crude product. An additional 4.8 g. is obtained on concentrating the benzene filtrate and wash to a volume of about 75 cc., cooling and filtering. The combined crude products, total 79.7 g., are crystallized from 350 cc. benzene, yielding 75.5 g. (76.5% theory) of white needles, M.P. 121–2.5° C.

*Example 7.—Di-(m-dimethylaminophenyl) ester of 1,6-diaminohexanethiophosphonic acid*

Z.NH(CH$_2$)$_6$NH$_2$

A solution of 44.5 g. di-(m-dimethylaminophenyl)-thiophosphoryl chloride (0.12 mole) in 400 cc. benzene is added to a mixture of 58.0 g. of a 72% aqueous solution of 1,6-hexanediamine (0.36 mole), 60 cc. 2 N ethanolic potassium hydroxide and 100 cc. benzene with stirring at 4–5° C. during 2 hours. The mixture is slowly warmed to room temperature with stirring during 3 hours, left at room temperature overnight, washed with four 50 cc. portions of water and dried over calcium sulfate. Solvent is removed under reduced pressure to 100° C./30 mm., leaving 51.1 g. crude di-(m-dimethylaminophenyl) ester of 1,6-diaminohexanethiophosphosic acid as an amber oil. The product may be purified through its mono-oxalate salt, if desired. This salt crystallizes from 2-butanone with one molecule of water as white crystals that melt indefinitely at 74–87° C.

*Example I. — N,N'-di-(di-m-dimethylaminophenylthiophosphoryl)hydrazine*

ZNHNHZ

A mixture of 14.77 g. di-(m-dimethylaminophenyl)-thiophosphoryl chloride (0.04 mole), 14.66 g. di-(m-dimethylaminophenyl) ester of hydrazinothiophosphonic acid (0.04 mole) and 3.16 g. pyridine (0.04 mole) is heated to 150° C. during 1 hour and held at about 150° C. for 2 hours, then cooled. The product is taken up in 50 cc. water plus 300 cc. ether. After adding 25 cc. 2 N sodium hydroxide and shaking, the ether layer is separated and washed with 2 N sodium hydroxide, with water and with saturated brine, stirred with a little Darco, dried over calcium sulfate and filtered. Removal of solvent by distillation leaves 25.65 g. (91% theory) of viscous dark red oil. The tetramethiodide crystallizes from a mixture of propylene glycol and absolute alcohol with 6 molecules of water as white crystals that melt with gas evolution at 144–6° C.

The tetramethobromide, dissolved in a mixture of 2 parts absolute alcohol and 1 part acetone and precipitated by adding excess isopropanol, is obtained as a white solid melting at 149–56° C. with gas evolution.

*Example II. — N,N'-di-(di-m-dimethylaminophenylthiophosphoryl)methylenediamine*

ZNHCH$_2$NHZ

To 3.82 gm. (11 millimoles) di-(m-dimethylaminophenyl)-aminothiophosphonate in 5 cc. acetone is added 0.41 cc. of 37 percent formaldehyde solution (5.5 millimoles), and the solution is left at room temperature for 4 days. After adding 3.69 gm. methyl iodide (26 millimoles), the solution is again left at room temperature for 4 days, then diluted with 30 cc. isopropanol and solvent removed by decantation. The oily residue solidifies on being dissolved in hot methanol and diluted cold with a mixture of absolute alcohol and isopropyl alcohol. It is purified by dissolving in propylene glycol and precipitating cold with absolute alcohol and with ether, and finally by dissolving in equal parts of methanol and acetone and precipitating cold with a mixture of equal parts of absolute alcohol and isopropanol. The tetramethiodide thus obtained is solvated with two molecules of propylene glycol and is a pale tan solid melting at 156–164° C. with gas evolution.

*Example III.—N,N'-di(di-m-dimethylaminophenylthiophosphoryl)-ethylenediamine*

ZNH(CH$_2$)$_2$NHZ

To 0.08 mole of di-m-dimethylaminophenylthiophosphoryl chloride is added 2.40 gm. ethylenediamine (0.04 mole). When the exothermic reaction has subsided, 6.32 gm. pyridine (0.08 mole) is added, and the mixture is heated under reflux in an oil bath at about 130° C. for 7 hours, then cooled and dissolved in a mixture of 50 cc. water and 250 cc. ether. After adding 10 cc. of 10 N NaOH, the mixture is shaken, and the aqueous layer is discarded. The ether layer is washed with two 25 cc. portions of 2 N NaOH, two 25 cc. portions of water and with 15 cc. saturated brine and dried over calcium sulfate. Removal of solvent by distillation to 100° C./15 mm. leaves 23.11 gm. very viscous dark amber oil. The tetramethiodide is prepared by the action of methyl iodide in a mixture of equal parts methanol and acetone at room temperature and is purified by crystallization from dilute acetone. It is obtained as white crystals melting at 204–7° C. with gas evolution.

*Example IV.—N,N'-di-(di-m-dimethylaminophenylthiophosphoryl)-N,N'-diphenylethylenediamine*

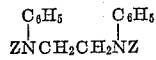

A mixture of 0.06 mole di-m-dimethylaminophenylthiophosphoryl chloride with 6.37 gm. N,N'-diphenylethylenediamine (0.03 mole) and 8.60 gm. tri-n-propylamine (0.06 mole) is heated in an oil bath at about 130° C. for 6 to 8 hours with occasional stirring, then cooled and taken up in 200 cc. benzene and 60 cc. 2 N NaOH. The benzene extract is washed successively with two 50 cc. portions of water, two 100 cc. portions of 2 N acetic acid, 50 cc. water, 100 cc. 2 N NaOH, two 50 cc. portions of water and with 30 cc. saturated brine and dried over calcium sulfate. Removal of solvent by distillation to 100° C./15 mm. leaves 26.70 gm. very viscous dark amber oil. The tetramethiodide is prepared in ethyl acetate and is purified by precipitating from solutions in methanol and in propylene glycol by adding excess isopropanol. It precipitates with 6 molecules of water as a pale tan solid that softens about 105° C. and melts unsharply about 117° C. with gas evolution.

*Example V.—N,N'-di-(di-m-dimethylaminophenylthiophosphoryl)-1,6-hexanediamine*

This compound is prepared from 0.06 mole di-m-dimethylaminophenylthiophosphoryl chloride, 0.03 mole 1,6-hexanediamine and 0.06 mole tri-n-propylamine as described in Example IV, except that heating is continued for only two hours, and is obtained as a very viscous amber oil. The tetramethobromide, prepared in acetone at room temperature and purified from a mixture of absolute alcohol and isopropanol, precipitates with 5 molecules of water as a tan solid that softens about 100° C. and melts at 115–8° C. with gas evolution.

*Example VI.—N,N' - di - (di - m - dimethylaminophenylthiophosphoryl) - N,N' - di - p - dimethylaminobenzyl-1,6-hexanediamine*

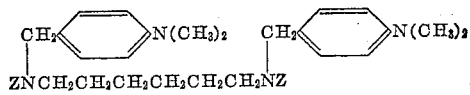

This compound is prepared as a viscous amber oil from 0.06 mole di-m-dimethylaminophenylthiophosphoryl chloride, 0.03 mole N,N'-di-p-dimethylaminobenzyl-1,6-hexanediamine and 0.06 mole tri-n-propylamine as described in Example IV. The hexamethiodide is prepared at room temperature using excess methyl iodide as solvent and is purified by repeatedly dissolving in warm propylene glycol, cooling, and precipitating with excess isopropanol. It precipitates with 2 molecules of water as a tan solid that melts at 136–42° C. with gas evolution.

*Example VII.—N,N',N''-tri-(di-m-dimethylaminophenylthiophosphoryl)diethylenetriamine*

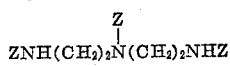

This compound, prepared from 0.06 mole di-m-dimethylaminophenylthiophosphoryl chloride, 0.02 mole diethylenetriamine and 0.06 mole tri-n-propylamine as described in Example IV, is obtained as a very viscous, dark amber oil. The hexamethiodide, prepared and purified as described in Example VI, precipitates with 10 molecules of water as a tan solid that softens about 100° C. and melts at 120–5° C. with gas evolution.

*Example VIII.—N,N',N''-tri-(di-m-dimethylaminophenylthiophosphoryl)-3,3'-diaminodipropylamine*

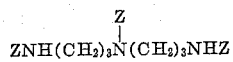

This compound and its hexamethiodide are prepared as described in Example VII, using 3,3'-diaminodipropylamine instead of diethylenetriamine. The base is obtained as a very viscous amber oil. The hexamethiodide precipitates with 10 molecules of water as a tan solid that softens about 116° C. and melts at 122–7° C. with gas evolution.

*Example IX.—N,N'-di-(di-m-dimethylaminophenylthiophosphoryl)tetraethylenepentamine*

$$ZNH(CH_2)_2NH(CH_2)_2NH(CH_2)_2NH(CH_2)_2NHZ$$

To a benzene solution of 0.06 mole di-m-dimethylaminophenylthiophosphoryl chloride in 275 cc. benzene is added a solution of 5.68 gm. tetraethylenepentamine (0.03 mole) in 50 cc. benzene with stirring during 15 minutes. The temperature increases from 26 to 31° C. during the addition and an oil separates. The mixture is stirred at about 60° C. for 2 hours (most of the oil dissolves), then cooled, and 30 cc. 2 N NaOH is added. The mixture is stirred at 30–35° C. for one half hour and at about 60° C. for one-half hour, then cooled. The benzene layer is washed with two 25 cc. portions 2 N NaOH, three 25 cc. portions of water and with 25 cc. saturated brine and dried over calcium sulfate. Solvent is removed under reduced pressure to 100° C./25 mm., leaving 22.2 gm. of a viscous amber oil. The hydrochloride salt, prepared in isopropanol and purified from a mixture of absolute alcohol and isopropanol, is obtained as an amorphous hygroscopic solid that softens about 100° C. and melts at 140–5° C. with gas evolution. The tetramethiodide is prepared in a mixture of 4 parts acetone and 6 parts isopropanol and is purified by repeatedly dissolving in warm propylene glycol, cooling, and precipitating with excess isopropanol. It precipitates with 12 molecules of water as a tan solid that melts at 131–4° C. with gas evolution.

*Example X. — N,N',N'',N''',N''''-penta-(di-m-dimethylaminophenylthiophosphoryl)-tetraethylenepentamine*

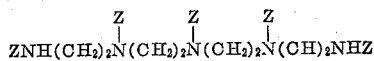

This compound is prepared from 78 millimoles di-m-dimethylaminophenylthiophosphoryl chloride, 15 millimoles tetraethylenepentamine and 75 millimoles tri-n-propylamine as described in Example IV, except that after heating at 130° C. of 6 hours, the reaction mixture is heated at 150° C. for one hour. The product, after removal of ether-soluble impurities by repeated extraction with ether, is obtained as a dark amber resin. The decamethiodide is prepared at room temperature using excess methyl iodide as solvent and is purified by repeatedly dissolving in mixtures of methanol, propylene glycol and acetone and precipitating with excess isopropanol. It precipitates with 15 molecules of water as a tan solid that melts at 138–42° C. with gas evolution.

*Example XI. — N,N' - di - (di-m-dimethylaminophenylthiophosphoryl)-o-phenylenediamine*

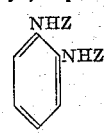

This compound is prepared from 0.06 mole di-m-dimethylaminophenylthiophosphoryl chloride, 0.03 mole o-phenylenediamine and 0.06 mole tri-n-propylamine as described in Example IV except that heating at 130° C. is continued for only 3 hours. The product is a very viscous dark amber oil. The tetramethiodide is prepared in a mixture of 3 parts acetone and 10 parts absolute alcohol and is purified by dissolving in absolute alcohol and in methanol and precipitating by added excess isopropanol. It precipitates with 6 molecules of water as a white solid melting at 123–6° C. with gas evolution.

*Example XII. — N,N' - di-(di - m-dimethylaminophenyl-thiophosphoryl)-p-phenylene diamine*

This compound is prepared from 0.06 mole di-m-dimethylaminophenylthiophosphoryl chloride, 0.03 mole p-phenylene diamine and 0.06 mole tri-n-propylamine as described in Example IV. It is also prepared in the same manner using pyridine in place of tri-n-propylamine. When purified by crystallization from methylethylketone and from a mixture of equal parts methylethylketone and 95 percent alcohol, the base is obtained as white crystals melting at 190–3° C. The tetramethiodide is prepared in acetone and is purified by dissolving in methanol and in 50 percent alcohol and precipitating with isopropanol. It precipitates with 2 molecules of water as a white solid that softens about 170° C. and melts at 195–8° C. with gas evolution.

*Example XIII. — N,N' - di-(di-m-dimethylaminophenyl-thiophosphoryl)benzidine*

This compound is prepared from 0.06 mole di-m-dimethylaminophenylthiophosphoryl chloride, 0.03 mole benzidine and 0.06 mole tri-n-propylamine as described in Example IV. When purified by crystallization from n-butanol, from carbon tetrachloride and from a mixture of ethyl acetate and isopropanol, it is obtained as white crystals that melt at 150–5° C. The base crystallizes from ethyl acetate or from acetone with two molecules of solvent. When crystallized from a mixture of 1 part benzene and 2 parts isopropanol, it is obtained in a non-solvated form as white plates, M.P. 168.5–9.5° C. The tetramethiodide is prepared at room temperature using excess methyl iodide as solvent and is purified by dissolving in methanol and precipitating with ethyl acetate and with isopropanol. It precipitates with 4 molecules of water as a pale yellow solid that melts at 160–5° C. with gas evolution. The tetramethobromide crystallizes from 95% alcohol with six molecules of water as white crystals that sinter about 158° C. and melt at 162–3° C. with gas evolution.

*Example XIV. — N,N'-di - (di-m-dimethylaminophenyl-thiophosphoryl)-p,p'-methylenedianiline*

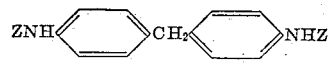

This compound, prepared from 0.06 mole di-m-dimethylaminophenylthiophosphoryl chloride, 0.03 mole mole p,p'-methylenedianiline and 0.06 mole tri-n-propylamine as described in Example IV, is obtained as an amber resin. The tetramethiodide is prepared in benzene and purified by dissolving in methanol and precipitating with ethyl acetate and with isopropanol. It precipitates with 5 molecules of water as a pale tan solid that melts at 140–50° C. with gas evolution.

*Example XV. — N,N' - di-(di - m-dimethylaminophenyl-thiophosphoryl)-p,p'-sulphonyldianiline*

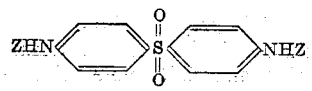

This compound, prepared from 0.06 mole di-m-dimethylaminophenylthiophosphoryl chloride, 0.03 mole p,p' - sulphonyldianiline and 0.06 mole tri - n - propylamine as described in Example IV, is obtained as a viscous amber oil. The tetramethiodide is prepared in acetone and is purified by repeatedly dissolving in propylene glycol and precipitating with isopropanol. It precipitates with 2 molecules of water as a pale tan solid that melts at 110–20° C. with gas evolution.

*Example XVI. — N,N' - di(di - m - dimethylaminophenyl thiophosphoryl)-2,5-dimethylpiperazine*

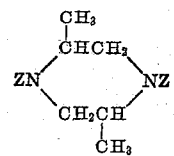

This compound, prepared from 0.06 mole di-m-dimethylaminophenylthiophosphoryl chloride, 0.03 mole 2,5-dimethylpiperazine and 0.06 mole tri-n-propylamine as described in Example IV and crystallized from ethyl acetate and from acetone, is obtained as a white solid that melts at 114–20° C. The tetramethiodide is prepared in acetone and crystallized from methanol. It crystallizes with 2 molecules of water as a white solid that melts at 171–3° C. with gas evolution.

*Example XVII.—N,N' - dimethyl - N,N' - di [(N" - p-dimethylaminobenzyl - N" - di - m - dimethylaminophenylthiophosphoryl) - 3 - aminopropyl] 1,5 - pentanediamine*

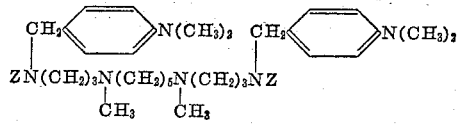

A mixture of 2.07 gm. N-di-(m-dimethylaminophenyl)-thiophosphoryl - N - p - dimethylaminobenzyl - 3 - dimethylaminopropylamine (3.63 millimoles) and 0.59 gm. 1,5-diiodopentane (1.82 millimoles) in 5 cc. methanol is kept at room temperature with occasional stirring for 3 days. An amber oil separates. After adding 1.93 gm. methyl iodide (14 millimoles), the mixture is left at room temperature with occasional stirring for an additional 4 days. The octamethiodide is obtained as an oil that slowly solidifies on being triturated with several portions of isopropanol. When purified by repeatedly dissolving in propylene glycol and precipitating by adding isopropanol, it is obtained as a tan solid that melts at 153–8° C. with gas evolution.

*Example XVIII.—O,O'-di-(di-m-dimethylaminophenyl-thiophosphoryl) ester of hydroquinone*

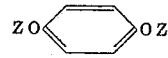

The O,O'-di(dichlorothiophosphoryl) ester of hydroquinone is prepared by adding 3.30 gm. hydroquinone (0.03 mole) to 10.17 gm. thiophosphoryl chloride (0.06 mole) in 100 cc. benzene with stirring at 3–5° C. during 5 minutes. A solution of 6.06 gm. triethylamine (0.06 mole) in 50 cc. benzene is then added at 3–5° C. during one-half hour. The mixture is stirred at 3–5° C. for 1½ hours and while warming to room temperature during 4½ hours, then left at room temperature overnight and filtered from triethylamine hydrochloride.

A solution of sodium m-dimethylamino-phenate is prepared by adding 2.76 gm. sodium (0.12 mole) and then 16.45 gm. m-dimethylaminophenol (0.12 mole) to a solution of 27.5 cc. isopropanol in 100 cc. benzene. This solution is cooled, and the previously prepared chloride solution is added with stirring at 3–5° C. during 1 hour. The mixture is stirred at 3–5° C. for 1 hour longer, left at room temperature for 6 days, washed successively with 20 cc. water, 50 cc. 2 N NaOH, two 20 cc. portions of water and with 20 cc. saturated brine and dried over calcium sulfate. Removal of solvent under reduced pressure to 100° C./12 mm. leaves 19.2 gm. of a viscous amber oil. The trimethiodide is prepared in a mixture of 1 part acetone and 3 parts absolute alcohol and is purified by dissolving in methanol and in propylene glycol and precipitating by adding excess isopropanol. It is obtained as a pale tan solid that melts at 122–5° C. with gas evolution.

When acetone alone is used as the solvent, the tetramethiodide, which crystallizes from methanol with four molecules of water and melts at 181–5° C. with gas evolution, is obtained.

*Example XIX.—N,N' - di - (di - m - dimethylaminophenylthiophosphoryl)1,5 - naphthalenediamine*

This compound, prepared from 0.06 mole di-m-dimethylaminophenylthiophosphoryl chloride, 0.03 mole 1,5-naphthalenediamine and 0.06 mole tri-n-propylamine as described in Example IV, is obtained as a viscous dark amber oil. The tetramethiodide is prepared in acetone and is purified by dissolving in mixtures of methanol and acetone and precipitating with isopropanol. It precipitates with 8 molecules of water as a pale tan solid that melts at 120–9° C. with gas evolution.

*Example XX.—Bis - (di - m - dimethylaminophenylthiophosphorylhydrazone) of 2,3-butanedione*

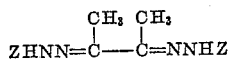

To a suspension of 5.86 g. di-(m-dimethylaminophenyl) ester of hydrazinothiophosphonic acid (16 millimoles) in 10 cc. 95 percent alcohol is added 0.69 g. 2,3-butanedione (8 millimoles). The mixture is boiled briefly on a steam bath until all solid is dissolved, then diluted with 15 cc. 95 percent alcohol, iced and filtered. The precipitate is 4.03 g. pale yellow solid. When purified by crystallization from a mixture of benzene and isopropanol, the base is obtained as white crystals melting at 184.5–5° C.

*Example XXI.—N,N'' - di - (di - m - dimethylaminophenylthiophosphoryl)diethylenetriamine*

ZNH(CH₂)₂NH(CH₂)₂NHZ

A solution of 37.1 g. di-(m-dimethylaminophenyl)-thiophosphoryl chloride (0.10 mole) in 350 cc. benzene is added to a mixture of 5.16 g. diethylenetriamine (0.05 mole), 50 cc. 2 N ethanolic potassium hydroxide and 100 cc. benzene with stirring at 4–6° C. during 3 hours. The mixture is slowly warmed to room temperature with stirring during 3 hours, left at room temperature overnight, washed with 2 N sodium hydroxide solution, with water and with saturated brine and dried over calcium sulfate. Solvent is removed under reduced pressure to 100° C./18 mm., leaving 31.6 g. very viscous, pale amber oil.

*Example XXII.—N,N'' - di - (di - m - dimethylaminophenylthiophosphoryl)-N'-palmitoyl diethylenetriamine*

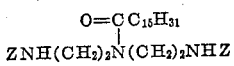

To a solution of 11.58 g. N,N''-di-(di-m-dimethylaminophenylthiophosphoryl)diethylenetriamine (0.015 mole) and 7.59 g. triethylamine (0.075 mole) in 100 cc. benzene is added a solution of 4.12 g. palmitoyl chloride in 50 cc. benzene with stirring during one-half hour. The temperature rises a few degrees and a precipitate forms during the addition. The mixture is stirred at 70–75° C. for four hours, cooled, washed with 50 cc. water, with four 25 cc. portions 2 N acetic acid, with 20 cc. 2 N sodium hydroxide solution, with three 25 cc. portions of water, and with two 15 cc. portions of saturated brine and is dried over calcium sulfate. Removal of solvent by distillation under reduced pressure to 100° C./15 mm. leaves 14.01 g. base as a viscous amber oil. The tetramethiodide is prepared in a 1:1 mixture of acetone and methanol and is precipitated by adding excess isopropanol. When purified by dissolving in absolute alcohol and adding isopropanol, it precipitates with two molecules of water as a very pale tan solid, melting at 121–4° C. with gas evolution, that gives a soapy solution in water.

*Example XXIII.—N,N',N'' - tri - (di - p - dimethylaminophenylthiophosphoryl)diethylenetriamine*

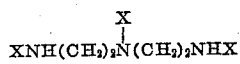

This compound, prepared from 0.033 mole di-p-dimethylaminophenylthiophosphorylchloride, 0.011 mole diethylenetriamine and 0.066 mole tri-n-butylamine as described in Example IV, is obtained as a viscous dark amber oil. The hexamethiodide, prepared in a 1:1 mixture of acetone and methanol, crystallizes from methanol with eight molecules of water and melts at 165–72° C. with gas evolution.

*Example XXIV.—N,N',N''-tri-(di - p - dimethylaminophenylthiophosphoryl)-3,3'-diaminodipropylamine*

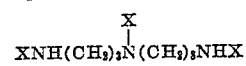

This compound, prepared from 34 millimoles di-p-dimethylaminophenylthiophosphoryl chloride, 11.3 millimoles 3,3'-diaminodipropylamine and 68 millimoles tri-n-butylamine as described in Example IV except that heating at about 130° C. is continued for 14 hours, is obtained as an amber resin. The hexamethiodide is prepared in a 1:1 mixture of methanol and acetone and is purified by dissolving in methanol and precipitating by adding isopropanol. It precipitates with eight molecules of water and melts at 162–6° C. with gas evolution.

*Example XXV.—N,N''' - di-(di-m-dimethylaminophenylthiophosphoryl)triethylenetetramine*

ZNH(CH₂)₂NH(CH₂)₂NH(CH₂)₂NHZ

Preparation of this compound from 37.1 g. di-(m-dimethylaminophenyl)thiophosphoryl chloride (0.10 mole), 7.31 g. triethylenetetramine (0.05 mole) and 55 cc. 2 N ethanolic potassium hydroxide as described in Example XXI, yields 33.6 g. viscous, pale yellow oil. The monocitrate salt, crystallized from 95% alcohol, is obtained as a white solid melting at 140–3° C.

*Example XXVI.—N,N''' - di-(di-m-dimethylaminophenylthiophosphoryl) - N',N'' - di - (di - p - dimethylaminophenylthiophosphoryl)triethylenetetramine*

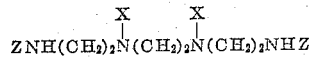

A mixture of 9.13 g. di-(p-dimethylaminophenyl)thiophosphoryl chloride (24.6 millimoles), 10.04 g. N,N'''-di-(di - m - dimethylaminophenylthiophosphoryl)triethylenetetramine (12.3 millimoles) and 6.77 g. N,N-dimethylbenzylamine (50 millimoles) is heated at about 130° C. with occasional stirring for 11 hours. The reaction mixture is taken up in benzene, filtered from N,N-dimethylaminobenzylamine hydrochloride, washed with water, 2 N acetic acid, 2 N sodium hydroxide, more water and with saturated brine and is dried over calcium sulfate. Removal of solvent under reduced pressure to 100° C./12 mm. leaves 16.89 g. amber resin. The octamethiodide, prepared in a 1:1 mixture of acetone and methanol, precipitated by adding excess isopropanol, purified by dissolving in warm ethylene glycol monomethylether and precipitating with excess isopropanol, precipitates with five molecules of water as a very pale tan solid melting at 145–51° C. with gas evolution.

*Example XXVII.—N,N',N'',N''' - tetra - (di-p-dimethylaminophenylthiophosphoryl)-triethylenetetramine*

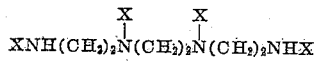

This compound, prepared from 34 millimoles di-(p-dimethylaminophenyl)thiophosphoryl chloride, 8.5 millimoles triethylenetetramine and 68 millimoles tri-n-butylamine as described in Example IV except that heating at about 130° C. is continued for 16 hours, is obtained as a brown resin. The octamethiodide, prepared in a 1:1 mixture of acetone and methanol and crystallized from methanol, crystallizes with twelve molecules of water and melts at 172–6° C. with gas evolution.

*Example XXVIII.—N,N''' - di - (di - m-dimethylaminophenylthiophosphoryl) - N',N''-di-(diphenylcarbamyl) triethylenetetramine*

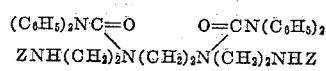

This compound, prepared from 2.87 millimoles N,N'''-di-(di-m-dimethylaminophenylthiophosphoryl)triethylenetetramine, 5.74 millimoles diphenylcarbamylchloride and 20 millimoles N,N-dimethylbenzylamine as described in Example IV except that heating at about 130° C. is continued for 13 hours, is obtained as an amber resin. The tetramethiodide, prepared in a 1:1 mixture of acetone and methanol, precipitated by adding excess isopropanol, and purified by dissolving in warm ethylene glycol monomethylether and precipitating with acetone and isopropanol, precipitates with four molecules of water as a pale tan solid melting at 128–32° C. with gas evolution.

*Example XXIX.—N,N''' - di - (di - m - dimethylaminophenylthiophosphoryl) - N',N''-di-(3,5-dinitrobenzoyl) triethylenetetramine*

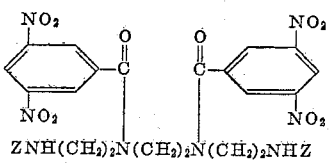

This compound, prepared from 3.5 millimoles N,N'''-di - ( di - m - dimethylaminophenylthiophosphoryl)triethylenetetramine, 10.5 millimoles 3,5-dinitrobenzoyl chloride and 20 millimoles N,N-dimethylbenzylamine as described in Example IV except that heating is at 110–20° C. for 5.5 hours, is obtained as a dark red resin. The tetramethiodide, prepared in methanol, precipitated by adding excess ethyl acetate, and crystallized from 90% ethanol, precipitates with four molecules of water as a yellow solid melting at 145–8° C. with gas evolution.

*Example XXX.—N,N''' - di - (di - m - dimethylaminophenylthiophosphoryl) - N',N''-di-(p-toluenesulfonyl) triethylenetetramine*

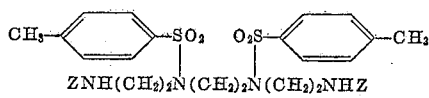

This compound, prepared from 3.5 millimoles N,N'''-di - ( di - m - dimethylaminophenylthiophosphoryl)triethylenetetramine, 7.7 millimoles p-toluenesulfonyl chloride and 20 millimoles N,N-dimethylbenzylamine as described in Example IV is obtained as an amber resin. The tetramethiodide, prepared in a 1:1 mixture of acetone and methanol, precipitated by adding excess ethyl acetate, and purified from the same solvents, is obtained as a white solid melting at 129–36° C. with gas evolution.

*Example XXXI.—N,N''' - di - (di - m - dimethylaminophenylthiophosphoryl) - N',N'' - di-(p-bromobenzenesulfonyl)triethylenetetramine*

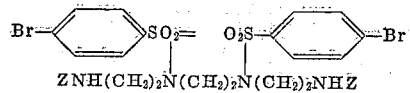

This compound and its tetramethiodide are prepared as described in Example XXX, using p-bromobenzenesulfonyl chloride instead of p-toluenesulfonyl chloride. The base is an amber resin. The tetramethiodide is a pale tan solid melting at 134–40° C. with gas evolution.

*Example XXXII.—N,N',N'',N''',N'''' - penta - (di - p-dimethylaminophenylthiophosphoryl)tetraethylenepentamine*

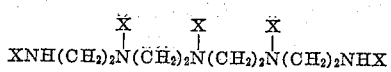

This compound is prepared from 37 millimoles di-(p-dimethylaminophenyl)thiophosphoryl chloride, 7.4 millimoles tetraethylenepentamine and 80 millimoles tri-n-butylamine as described in Example IV, except that the reaction mixture is heated 13 hours at about 130° C., 8 hours at about 150° C., and 1 hour at about 170° C. The product, after removal of ether-soluble impurities by repeated extraction with ether, is obtained as a very viscous, dark amber oil. The decamethiodide, prepared in a 1:1 mixture of acetone and methanol and purified by dissolving in warm propylene glycol and precipitating by adding excess methanol, precipitates with fifteen molecules of water as a tan solid melting at 173–6° C. with gas evolution.

*Example XXXIII.—N,N' - di - (di - m - dimethylaminophenylthiophosphoryl)m-phenylenediamine*

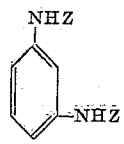

This compound, prepared from 0.06 mole di-(m-dimethylaminophenyl)thiophosphoryl chloride, 0.03 mole m-phenylenediamine and 0.06 mole tri-n-propylamine as described in Example IV except that the reaction mixture is heated at about 130° C. for 5 hours and at about 140° C. for 2 hours and purified by crystallization from carbon tetrachloride and from isopropanol, is obtained as white crystals melting at 157–160° C. The tetramethiodide, prepared in acetone and crystallized from a mixture of methanol, absolute alcohol and acetone, crystallizes with four molecules of water as white crystals melting at 144–50° C. with gas evolution.

*Example XXXIV.—N,N' - di - (di - m - dimethylaminophenylthiophosphoryl)-o-dianisidine*

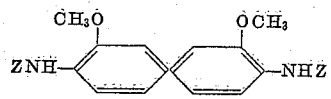

This compound, prepared from 0.2 mole di-(m-dimethylaminophenyl)-thiophosphoryl chloride, 0.1 mole o-dianisidine and 0.4 mole N,N-di-methylbenzylamine as described in Example IV except that heating at about 130° C. is continued for only 4 hours, and purified by crystallization from ethyl acetate, is obtained as white crystals melting at 156–8° C. The tetramethiodide, prepared in acetone and crystallized from methanol, crystallizes with three molecules of water and melts at 166–70° C. with gas evolution. The tetramethiobromide, prepared in acetone, precipitated by adding excess isopropanol and purified by dissolving in a mixture of 2 parts absolute alcohol and one part acetone and precipitating by adding excess ethyl acetate, precipitates with four molecules of water and melts at 143–6° C. with gas evolution.

*Example XXXV.—N,N' - di - (di - p - dimethylaminophenylthiophosphoryl)-o-dianisidine*

A mixture of 34 millimoles di-(p-dimethylaminophenyl)-thiophosphoryl chloride, 17 millimoles o-dianisidine and 68 millimoles tri-n-butylamine is stirred at about 130° C. for 6 hours, cooled, diluted with 50 cc. benzene and filtered. The precipitate is crystallized twice from chlorobenzene, then stirred with hot benzene to remove last traces of chlorobenzene, cooled and filtered, yielding white crystals that turn brown about 274° C. and melt at 288–90° C. The tetramethiodide is prepared by refluxing a suspension of the base in methanol with methyl iodide for several days. It crystallizes from methanol with six molecules of water, turns brown at about 248° C. and decomposes at about 285° C.

*Example XXXVI.—N,N' - di - (di - m - dimethylaminophenylthiophosphoryl)-α,α'-bi-p-toluidine*

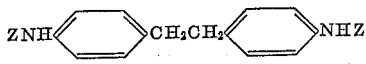

This compound, prepared from 0.06 mole di-(m-dimethylaminophenyl)thiophosphoryl chloride, 0.03 mole α,α'-bi-p-toluidine and 0.06 mole tri-n-propylamine as described in Example IV except that the reaction mixture is heated at about 130° C. for 5 hours and at about 150° C. for 8 hours, and crystallized from butanol and from a mixture of acetone and 95% alcohol, is obtained as white crystals melting at 154–66° C. with gas evolution. The tetramethiodide, prepared in acetone and purified by dissolving in ethylene glycol monomethyl ether and precipitating by adding excess isopropanol, precipitates with four molecules of water and melts at 135–9° C. with gas evolution.

*Example XXXVII.—Succinyl diamide of di-(m-dimethylaminophenyl) ester of 1,6 - diaminohexanethiophosphonic acid*

ZNH(CH₂)₆NHCO(CH₂)₂CONH(CH₂)₆NHZ

To a solution of 6.49 g. di-(m-dimethylaminophenyl) ester of 1,6-diaminohexanethiophosphonic acid (14.4 millimoles) and 7.2 cc. 2 N ethanolic potassium hydroxide in 100 cc. benzene is added a solution of 1.12 g. succinyl chloride (7.2 millimoles) in 50 cc. benzene with stirring at 4–5° C. during one-half hour. The mixture is stirred at 4–5° C. for one hour and while warming to room temperature during 4 hours. After standing at room temperature overnight, the mixture is washed with 50 cc. water, 25 cc. 2 N acetic acid, 25 cc. 2 N sodium hydroxide solution, two 15 cc. portions of water and 15 cc. saturated brine and is dried over calcium sulfate. Removal of solvent by distillation under reduced pressure to 100° C./25 mm. leaves 4.06 g. of a viscous amber oil. The tetramethiodide, prepared in a 1:1 mixture of acetone and methanol and purified by dissolving in propylene glycol and precipitating with excess isopropanol, precipitates with eight molecules of water and melts at 103–10° C. with gas evolution.

*Example XXXVIII.—Sebacyl diamide of di-(m-dimethylaminophenyl) ester of 1,6 - diaminohexanethiophosphonic acid*

ZNH(CH₂)₆NHCO(CH₂)₆CONH(CH₂)₆NHZ

This compound is obtained as a very viscous amber oil when prepared as described in Example XXXVII, using sebacyl chloride instead of succinyl chloride. The tetramethiodide, prepared in acetone, precipitated by adding excess isopropanol, and purified by dissolving in a 1:1 mixture of acetone and methanol and precipitating with isopropanol, precipitates with 5 molecules of water as very pale tan needles that melt at 93–101° C. with gas evolution.

*Example XXXIX.—Fumaryl diamide of di-(m-dimethylaminophenyl) ester of 1,6 - diaminohexanethiophosphonic acid*

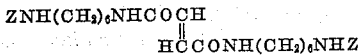

This compound is obtained as a very viscous amber oil when prepared as described in Example XXXVII, using fumaryl chloride instead of succinyl chloride. The tetramethiodide, prepared and purified as described in Example XXXVIII, precipitates with three molecules of water as a pale tan solid melting at 122–32° C. with gas evolution.

*Example XL.—Phthaloyl diamide of di-(m-dimethylaminophenyl) ester of 1,6-diaminohexanethiophosphonic acid*

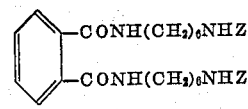

This compound is obtained as a very viscous, pale amber oil when prepared as described in Example XXXVII, using phthaloyl chloride instead of succinyl chloride. The tetramethiodide, prepared and purified as described in Example XXXVIII, precipitates with two molecules of water and melts at 114–23° C. with gas evolution.

*Example XLI.—m-Benzenedisulfonyl diamide of di-(m-dimethylaminophenyl) ester of 1,6-diaminohexane thiophosphonic acid*

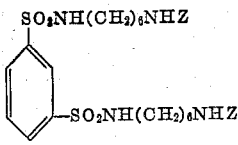

This compound is obtained as a very viscous amber oil when prepared as described in Example XXXVII, using m-benzenedisulfonyl chloride instead of succinyl chloride. The tetramethiodide, prepared in excess methyl iodide as solvent, precipitated by adding ethyl acetate, and purified by dissolving in propylene glycol, methanol or absolute alcohol and precipitating by adding excess isopropanol, precipitates with two molecules of water and melts at 107–12° C. with gas evolution.

*Example XLII.—Thiophosphoryl triamide of di-(m-dimethylaminophenyl) ester of 1,6-diaminohexane thiophosphonic acid*

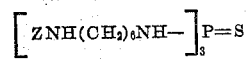

This compound, prepared from 13.7 millimoles di-(m-dimethylaminophenyl) ester of 1,6-diaminohexanethiophosphonic acid, 4.6 millimoles thiophosphoryl chloride and 6.9 cc. 2 N ethanolic potassium hydroxide as described in Example XXXVII, is obtained as a very viscous amber oil. The hexamethiodide, prepared and purified as described in Example XXXVIII, is obtained as a very pale, tan, deliquescent solid that melts at 100–110° C. with gas evolution.

*Example XLIII.—Fumaryl diamide of di-(m-dimethylaminophenyl) ester of ethylenediaminothiophosphonic acid*

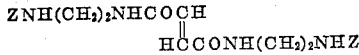

This compound, prepared from 20 millimoles di-(m-dimethylaminophenyl) ester of ethylenediaminothiophosphonic acid, 10 millimoles fumaryl chloride and 10 cc. 2 N ethanolic potassium hydroxide as described in Ex-

*Example XLIV.—Phthaloyl diamide of di-(m-dimethylaminophenyl) ester of ethylenediaminothiophosphonic acid*

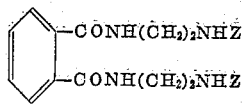

This compound is obtained as a very viscous, dark amber oil when prepared as described in Example XLIII, using phthaloyl chloride instead of fumaryl chloride. The tetramethiodide, prepared in a 1:1 mixture of acetone and methanol and purified by dissolving in propylene glycol or ethylene glycol monomethyl ether and precipitating with isopropanol, is obtained as a tan solid melting at 128–36° C. with gas evolution.

*Example XLV.—Thiophosphoryl triamide of di-(m-dimethylaminophenyl) ester of ethylenediaminothiophosphonic acid*

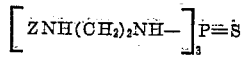

A mixture of 13.0 g. di-(m-dimethylaminophenyl) ester of ethylenediaminothiophosphonic acid (33 millimoles), 1.69 g. thiophosphoryl chloride (10 millimoles), 15.16 g. triethylamine (150 millimoles) and 25 cc. benzene is heated under reflux at a bath temperature of 105–10° C. for 14 hours. The mixture is cooled, diluted with 200 cc. benzene, washed with water, 2 N acetic acid, 2 N sodium hydroxide solution, again washed with water and with saturated brine and dried over calcium sulfate. Removal of solvent under reduced pressure to 100° C./14 mm. leaves 12.11 g. very viscous yellow oil. The tetramethiodide, prepared in a 1:1 mixture of acetone and methanol, precipitated by adding excess isopropanol and purified by dissolving in ethylene glycol monomethyl ether and precipitating with isopropanol, precipitates with eight molecules of water as a white solid melting at 130–7° C. with gas evolution.

*Example XLVI.—Octadecylthiophosphoryl diamide of di-(m-dimethylaminophenyl) ester of ethylenediaminothiophosphonic acid*

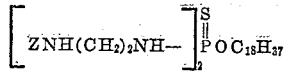

A mixture of 8.29 g. di-(m-dimethylaminophenyl) ester of ethylenediamino thiophosphonic acid (21 millimoles), 4.03 g. octadecylthiophosphoryl chloride (10 millimoles), 10.11 g. triethylamine (100 millimoles) and 15 cc. benzene is heated under reflux at a bath temperature of about 95° C. for 6 hours. The reaction mixture is cooled, diluted with 150 cc. benzene, washed with water, 2 N acetic acid, 2 N sodium hydroxide solution, again washed with water and with saturated brine and dried over calcium sulfate. Removal of solvent under reduced pressure to 100° C./18 mm. leaves 10.94 g. viscous yellow oil. The tetramethiodide, prepared and purified as described in Example XLV, melts at 124–34° C. with gas evolution and gives a soapy solution in water.

*Example XLVII.—Thiophosphoryl-N'-triamide of N,N''-di-(di-m-dimethylaminophenylthiophosphoryl)diethylenetriamine*

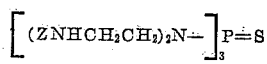

A mixture of 15.56 g. N,N''-di-(di-m-dimethylaminophenylthiophosphoryl)diethylenetriamine (15 millimoles), 0.85 g. thiophosphoryl chloride (5 millimoles), 7.58 g. triethylamine (75 millimoles) and 10 cc. benzene is heated under reflux at a bath temperature of 105–10° C. for 15 hours. The reaction mixture is cooled, diluted with 100 cc. benzene, washed with water, 2 N acetic acid, 2 N sodium hydroxide solution, again washed with water and with saturated brine and dried over calcium sulfate. Removal of solvent under reduced pressure to 100°C./14 mm. leaves 11.20 g. very viscous amber oil. The dodecamethiodide, prepared and purified as described in Example XLV, is obtained as a white solid melting at 132–7° C. with gas evolution.

*Example XLVIII.—O,O'-di-(di-m-dimethylaminophenylthiophosphoryl) ester of 4,4'-dihydroxydiphenyl*

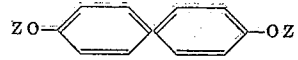

The O,O'-di(dichlorothiophosphoryl) ester of 4,4'-dihydroxydiphenyl is prepared by adding 14.14 g. triethylamine (0.14 mole) to a mixture of 23.7 g. thiophosphoryl chloride (0.14 mole) and 13.04 g. 4,4'-dihydroxydiphenyl (0.07 mole) in 200 cc. benzene with stirring at 2–4° C. during one hour. The mixture is stirred at 2–4° C. for one hour and while slowly warming to room temperature during 5 hours and is left at room temperature for 3 days. After removal of triethylamine hydrochloride by filtration and of solvent by distillation under reduced pressure, the residue is crystallized from ligroin, yielding 21.0 g. white solid melting at 62–5° C. This material is caused to react with sodium m-dimethylamino-phenate as described in Example XVIII, and the product is purified by crystallization from ethyl acetate to give a white solid that melts at 130–8° C. The tetramethiodide is prepared by refluxing a suspension of the base in methanol and methyl iodide for several days until all solid is dissolved. When precipitated by adding isopropanol and crystallized from 95% alcohol, the tetramethiodide crystallizes with four molecules of water and melts at 133–6° C. with gas evolution.

I claim:

1. A poly di-(di-lower-alkylaminophenyl)thionophosphoryl compound containing from two to five di-(di-lower-alkylaminophenyl) thionophosphoryl groups.

2. A poly di-(m-dimethylaminophenyl)thionophosphoryl compound containing from two to five di-(m-dimethylaminophenyl) thionophosphoryl groups.

3. A compound of the group consisting of thionophosphoryl compounds of the general formula

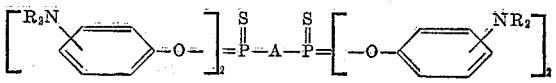

wherein R represents a lower alkyl group and A represents a divalent polyatomic group selected from the group consisting of hydrazino, diiminoalkylene, polyiminopolyalkylene, diiminoarylene, diiminoaralkylene, diiminodiarylenesulphonyl, piperazino, dioxyarylene, dihydrazinoalkylene, diiminodiimidopolyalkylene, diiminodialkylenediimidoarylene, diiminodiarylenedisulfonimidoarylene, and polyiminothionophosphorylimidopolyalkylene, and the acid addition salts and quaternary salts thereof.

4. A compound as defined in claim 3 wherein the $R_2N$- groups are in the meta position.

5. A compound as defined in claim 3 wherein the terminal atoms of A attached to the phosphorus atoms are nitrogens.

6. A compound as defined in claim 5 wherein A is a hydrazino group.

7. A compound as defined in claim 5 wherein A is a diiminoalkylene group.

8. A compound as defined in claim 5 wherein A is a polyiminopolyalkylene group.

9. A compound as defined in claim 8 wherein a monovalent group of the formula

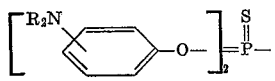

wherein R is a lower alkyl group, is attached to at least one of the intermediate nitrogens of the polyiminopolyalkylene group.

10. A compound as defined in claim 5 in which the terminal nitrogens are connected by an aryl radical.

11. A compound as defined in claim 3 wherein the terminal atoms of A attached to the phosphorus atom are oxygens.

12. A compound as defined in claim 11 in which the terminal oxygens are connected by an aryl radical.

13. The method of making poly di-(di-lower-alkylaminophenyl)thiophosphoryl compounds which comprises reacting in any order $n$ moles of a thiophosphoryl trihalide with $2n$ moles of a di-lower-alkylaminophenol and with one mole of a polyfunctional compound containing at least $n$ groups selected from primary amino, secondary amino and hydroxyl, $n$ being at least two and not more than five.

14. The method as defined in claim 13 wherein at least one of the moles of the thiophosphoryl halide is first reacted with di-lower-alkylaminophenol.

15. The method as defined in claim 13 wherein at least one of the moles of the thiophosphoryl halide is first reacted with the polyfunctional compound.

16. N,N' - di - (di - m - dimethylaminophenylthiophosphoryl) hydrazine.

17. N,N' - di - (di - m - dimethylaminophenylthiophosphoryl) ethylenediamine.

18. N,N',N'',N''',N'''' - penta - (di - m - dimethylaminophenylthiophosphoryl)-tetraethylenepentamine.

19. N,N' - di - (di - m - dimethylaminophenylthiophosphoryl) benzidine.

20. O,O' - di - (di - m - dimethylaminophenylthiophosphoryl) ester of 4,4'-dihydroxydiphenyl.

No references cited.